Oct. 17, 1944.  G. FROVA  2,360,411
AUTOMATIC APPARATUS FOR ALIGNING AND PITTING OLIVES, ETC
Original Filed June 30, 1942  8 Sheets-Sheet 1

INVENTOR.

Oct. 17, 1944. G. FROVA 2,360,411
AUTOMATIC APPARATUS FOR ALIGNING AND PITTING OLIVES, ETC
Original Filed June 30, 1942 8 Sheets-Sheet 2

INVENTOR.

Oct. 17, 1944.  G. FROVA  2,360,411
AUTOMATIC APPARATUS FOR ALIGNING AND PITTING OLIVES, ETC
Original Filed June 30, 1942  8 Sheets-Sheet 4

INVENTOR.

Oct. 17, 1944. G. FROVA 2,360,411
AUTOMATIC APPARATUS FOR ALIGNING AND PITTING OLIVES, ETC
Original Filed June 30, 1942 8 Sheets-Sheet 8

INVENTOR.
Giovanni Frova
BY
Haseltine, Lake & Co.
ATTORNEYS.

Patented Oct. 17, 1944

2,360,411

UNITED STATES PATENT OFFICE 2,360,411

AUTOMATIC APPARATUS FOR ALIGNING AND PITTING OLIVES, ETC.

Giovanni Frova, Jackson Heights, N. Y.

Original application June 30, 1942, Serial No. 449,116. Divided and this application February 22, 1943, Serial No. 476,703

6 Claims. (Cl. 146—27)

This application is a division of my copending application for Apparatus for sorting fruits, filed June 30, 1942, Serial No. 449,116.

This invention relates to apparatus for feeding, aligning and pitting olives and the like.

The main object of my invention is to provide an efficiently combined apparatus capable of receiving olives and other oval or elongate fruits having removable pits, feeding them to special aligning rollers and pitting said fruits while aligned therewith upon said rollers.

A further object is to have a compact apparatus for the present purpose which requires a minimum of attendants and occupies a minimum amount of floor space, while requiring a minimum outlay of funds for a maximum output of pitted and sorted olives or other product of this class.

It is also an object to provide apparatus of this character indicated which is so positive and effective in its operations that only a very small percentage of the fruits or berries handled are injured, while the major portion is perfect and of the highest quality.

Other objects and the advantages of my invention and its actual use in practice will appear more fully in detail as this specification proceeds.

In order to bring out the salient features of the invention in comprehensible manner and to the best advantage, the same is illustrated in the accompanying drawings forming part hereof, in which:

Figs. 8 through 15 are a series of views of de-stemming and pitting mechanism of the apparatus on the order of Fig. 5 to illustrate successive stages of operation in turning, stemming and pitting a cherry or the like. Fig. 15a is a detail.

Fig. 18 is a side elevation of a modification of the placing and pitting mechanism, of Figs. 8 to 17 illustrating the pitting of an olive or the like.

Fig. 20 is an end view of a detail of Fig. 19.

Throughout the views, the same references indicate the same or like parts.

In the fruit and berry handling art, and particularly in apparatus for handling such berries and fruits as cherries and the like, certain operations have heretofore been carried out by hand and while others have been effected by separate machines. This has entailed repeated rehandling of the cherries at various stages and the use of a considerable number of attendants. This involves expense, inconvenience, and the use of a great amount of floor space, all of which greatly increases the cost of the final product.

In orer to overcome these disadvantages, and particularly with the foregoing objects in view it is now proposed to carry out in a combined machine the entire group of operations required to pit and deliver cherries and the like from the original clusters.

Hence, referring now again to the drawings in

Figs. 1 to 5, a fruit or berry handling machine, generally indicated at 1 has a main frame 2 upon which are fixed bearings 3, 3 for a main drive shaft 4 (driven by a motor or other means not shown) having a pulley 5 fixed thereon and connected by a belt 6 to a pulley 7 on one end of a second shaft 8 supported in bearing 9 on post 10 secured on the frame 2. On the other end of this shaft 8 is fixed a stud pinion 11 meshing with a ring gear 12 on the periphery at one end of a grading drum generally indicated at 13. This drum is supported in inclined position upon a group of grooved rollers 14, 15, etc., carried on an arm 16 on a second post 17 and on further supports 18, 19, etc., on the machine frame, the drum having spaced peripheral rails 20, 21, etc., riding in the grooves of the rollers and thereby locating said drum in position while allowing the same to rotate on said rollers.

Forming the first or introductory portion of drum 13 is a de-clustering section 22 which is located at the higher end of the drum, immediately within a hopper 23 supported closely adjacent said end of the drum by a bracket 24 secured to post 10 and by an extension 25 upon the second post 17 already mentioned.

Figure 4:
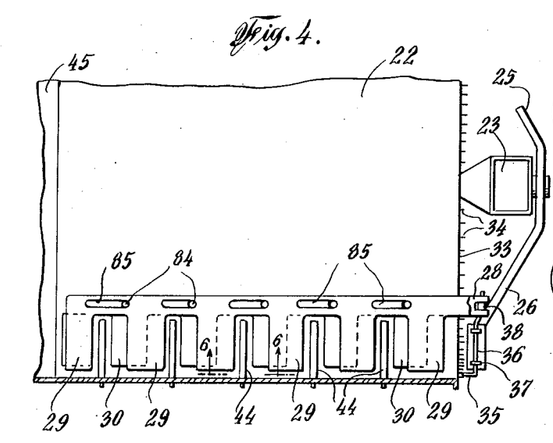
Fig. 4 is an enlarged fragmentary sectional view of the right end or de-clustering portion of the drum surmounting the apparatus of Fig. 1.

A further bracket 26 extends from the hopper toward the edge of the drum and meets with an upward extension 27 upon post 10 in order to support a stationary bracket 28 which has an upper cutting blade 29 extending horizontally toward the periphery of the drum and a movable knife or cutter 30 dove-tailed at 31, 32 to the first blades so as to be slidable with respect to the same in the axial direction of the drum. In order to operate the cutter constituting this construction, the edge 33 of the de-clustering portion of the drum has a series of projections 34, 34 which during rotation of the drum as a whole engage with a finger 35 fixed on a rocking shaft 36 mounted in bearings 37, 37 on bracket 28 and carrying at the other end an arm 38 having a pin 39 projecting into vertical slots 40, 40 in the lugs 41 fixed to the lower portion of the cutter or blade 30. When the cutter has been operated in one direction to cooperate with the upper cutter 29 so as to shear off the branch connection between the stems in the cluster of cherries by contact of finger 35 with a drum projection 34, a return spring 42 attached to the lower portion of plate 30 at one end and at the other end to a post 43 on bracket 28 will cause the cutters to separate ready for the next cutting operation. As best seen in Fig. 4, each cutter member 29, 30 is comb-shaped to form a multiple cutter, the movement being limited by, and the cutters further retained in association by retaining studs 84 on the lower fixed multiple cutter plate 30 extending up through operating slots 85 in the upper movable multiple cutter member 29.

In order to cooperate with the cutters, a group of rigid arms 44 extend radially inward from the interior of the de-clustering section of the drum and are so disposed that each group is arranged along a line upon the drum in parallelism with the axis thereof within each one of the projections 34. These arms serve to pick up individual clusters of cherries and expose the stems of the same at the proper moment to the cutters 29 and 30 when they are temporarily open, so that the connection between the stems in each cluster will be snipped off by the closing of the cutters. When the stems of the cherries have thus been separated, the latter with their individual stems intact will gradually feed down along the grading sections 45 to 49, due to the rotation of the latter and slight inclination of the same, so that the cherries will travel within said drum until the section is reached wherein the holes 50, etc., are sufficiently large to allow these cherries to drop through. As grading drums for various purposes are well known, it will suffice to mention that in this section 45 the holes 51 are the smallest in the series, while the holes or apertures in the succeeding sections are increasingly larger with the holes 52 in section 49 largest of all. It may be added that the apertures in the grading sections are, of course, placed all about the drum so that the fruit dropping through the same will fall upon a series of predetermined points of a slidable reciprocating feed plate 53 having rollers 54 resting upon a supporting plate 55 supported upon posts 56 and 17. Below the drum an apron 57 and a stem retainer 58 have the upper surfaces inclined in converging manner generally toward the initial location of row of apertures 59 in the feed plate serving to catch falling cherries 60 therein. It may be stated that always the cherries 60 will fall in such position that when they drop into apertures 59 in the mentioned feed plate their stems 61 will be directed generally upward. To the lower end of the feed plate is connected a link 62 at 63 which in turn is connected to and driven by a bar 64 fixed upon a sliding shaft 65 supported in a bearing 66 in post 10 while a cross head 67 connects said shaft with an eccentric ring 68 mounted upon an eccentric 69 fixed on drive shaft 4.

Figures 6, 7:
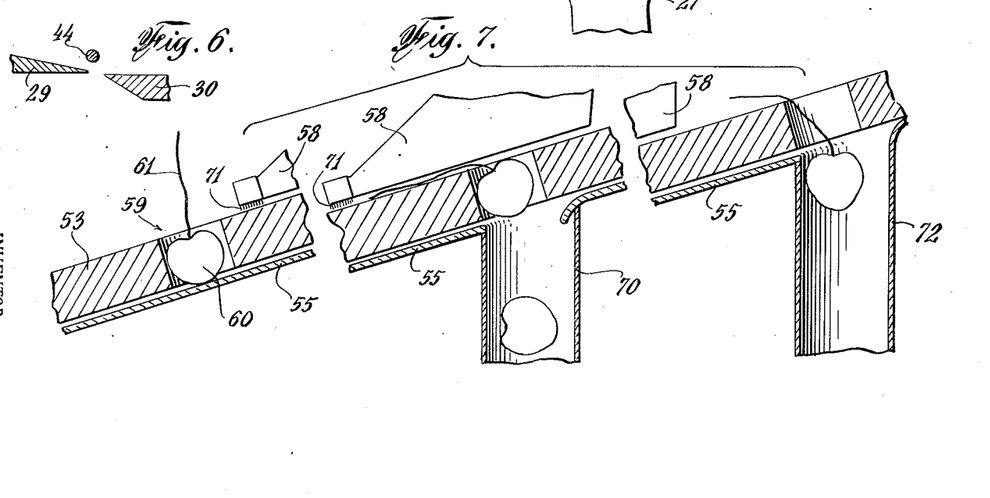
Fig. 6 is a detail section taken on line VI—VI in Fig. 4.
Fig. 7 is an enlarged fragmentary detail view of a feeder of the upper central portion of Fig. 3 with some parts removed and others in section to disclose the essential parts in initial position, with a cherry in place as first deposited, as partly fed forward and then finally released.

From the foregoing it is clear that upon rotation of the drive shaft the eccentric 69 will cause shaft 65 to reciprocate in bearing 66, and thus through bar 64, and link 62, drive the feed plate 53 upwardly along the support 55 until apertures 59 will register with the upper end of a row of tubes 70 which open in predetermined position through support plate 55. However, when the cherries have been brought part of the distance toward these tubes, the stems thereof will make contact with an entrance portion beneath stem retainer 58 which will tend to turn down the stem due to the movement of the feed plate 53 and wipe said stems under said stem retainer, so that each cherry that has a stem is virtually suspended upon the feed plate by the stem above the corresponding tube 70 during movement of this feed plate until said plate has moved the cherry beyond said tube 70 to one of a series of rear feed tubes 72. Any excess cherries upon the plate above the one deposited in cherry aperture 59 will be brushed off by the downwardly directed brushes 71 (Fig. 7) mounted at the entrance portion of the stem retainer, and due to the sharp inclination of the feed plate, such excess cherries will roll back to the initial position of the cherry aperture, ready to drop into the same during a succeeding cycle of operation of the feed plate. The cherries having stems will thus be carried by the feed plate past tube 70, but should any cherry have lost its stem, the stem retainer 58 will not operate to suspend the cherry in the aperture 59, but said cherry will instead drop from said aperture down through tube 70 to a collector 73 below the machine. At a point approximately above tube 70, the stem retainer terminates so that when the cherries which have been carried past tube 70 reach tube 72, the stem retainer no longer retains the stems lying upon feed plate 53, but frees the same so that these cherries may drop individually in said tubes 72, down into individual troughs 74 in a trough member 71 forming part of a de-stemming device generally indicated at 75, each trough having resilient rubber side walls 76, 76 for gently retaining the cherry in central position within the trough, the troughs in each case being open in front and above.

Figure 16:
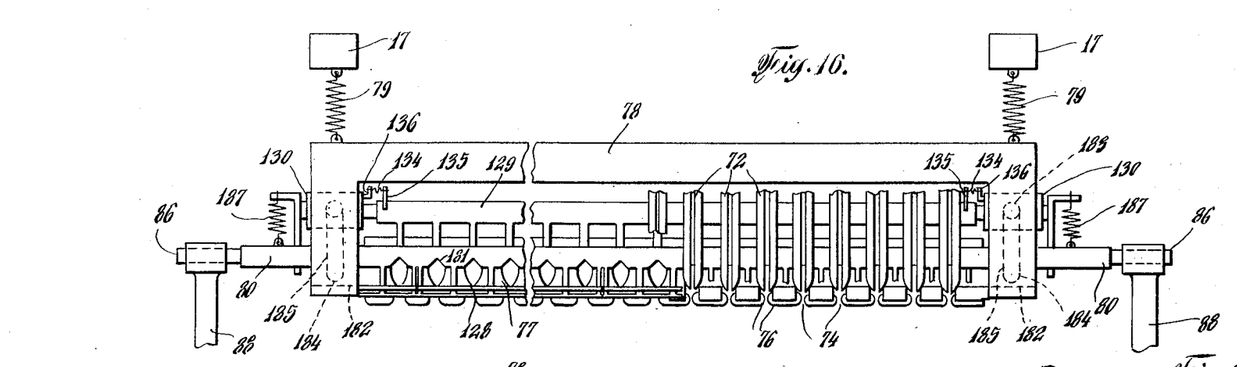
Fig. 16 is an enlarged fragmentary side elevation of a portion of Fig. 1 with parts torn away to disclose detail.

The lower end of each of the feed tubes 72 preferably terminates a short distance above the fixed trough member 77 forming the backing of the resilient walls 76, 76, while between said lower end and said walls is located a slidable open frame 78 supported upon these walls and disposed in an inclined position for a reason that will immediately appear. As the frame 78 is slidable downward in inclined direction in order to function, the same has retaining springs 79, 79 secured thereto and anchored to the posts 17, etc., of the machine in order to prevent downward movement of said frame until the same positively operated, as may be seen in Figs. 3, 8 and 16. Slidably associated with the mentioned frame is a de-stemming plate 80 which has a peaked opening 81 arranged substantially above each trough, while the peak or apex 82 is located centrally with respect to the trough walls so that the opening will be symmetrical with the corresponding feed tube 72 in each case. The plate 80 is arranged to slide in side slots 83 in frame 78, which terminate at 182, 182 to form stops for plate 80 against which the plate will engage to operate and move said frame positively and bring the same down into a final position shown in Figs. 10 and 11. It is, of course, intended that the openings 81 in plate 80 shall register with the corresponding feed tubes and troughs, the latter as a group in trough member 77 being rigidly mounted on a pedestal 86 fixed on the frame of the machine.

It may be mentioned here that, as will presently be described, the movement of plate 80 will direct or bend the stem 61 of each cherry forward or out from its respective trough, and in order to provide clearance for long stems, each feed tube 72 has a pair of vertical projecting front lips or edges spaced apart to form a slot to allow such stems to be drawn forward freely without meeting any obstruction.

At the ends of plate 80 are secured pivot pins 86, 86 projecting into slots 87 in levers 88, 88 pivoted intermediate their extremities at 89 to fixed portions of the machine, as for example to the trough member 77. To the other ends of these levers are connected further levers 90 (Fig. 3) pivoted at 91 and in turn connected at their lower ends to the rear ends of long links 92, the latter being pivotally connected at their forward ends to the bar 64 reciprocated by the eccentric as already described. Upon this bar are also mounted a series of pit punches 93 directed rearwardly toward the trough member 77, while rearwardly of said latter member are a second series of pit punches 94 entering the individual troughs through rear apertures 95, while being slidably supported in bearings 96. The last mentioned punches 94 are connected to a bar 97 and cam rollers 98 operating on cams 99 fixed to shaft 100 rotated in synchronism with shaft 4 by means of a chain 101 engaging with sprockets 102, 103 fixed upon shafts 4 and 100 respectively. A short distance in front of the trough member 77 is a stop member 104 with a cavity 105 facing the troughs 74, 74 and having apertures 106 through which punches 93 may be projected during operation. Between the cavities 105 and the troughs is a forked gate means 107 swingably suspended upon member 104 at 108, there being a downwardly open slot in said member 107 for each trough through which the corresponding forward and rear punches may project. Below the trough member 77 and stop member 104 is a chute 181 through which pitted cherries are intended to fall from the space between the trough member and the stop member, said chute extending down to a raised horizontal portion 110 of a conveyor generally indicated at 111 operating with portions thereof in a water tank 112 and driven by a roller 113 rotated by a pulley 114 from a pulley 115 through a belt 116. While the tank is shown as disposed beneath the machine, the rear portion thereof is intended to be sufficiently extended to project beyond the rear posts 117 of the machine frame 2.

The upper horizontal portion 110 of the conveyor operates at slightly higher level than the level 118 of the water in tank 112, while an inclined partition 119 extends downwardly from a short distance below the water level at the entrance portion of the tank toward the outlet portion in the rear, while a downwardly extending portion 120 and a lower horizontal portion 121 of the conveyor pass beneath said partition and beyond the rear lower end thereof. The upwardly inclined portion 122 of the conveyor rises to pass over roller 123 and then down at 124 and beneath the tank at 125 and thence up again at 126 over roller 113.

Figure 1:
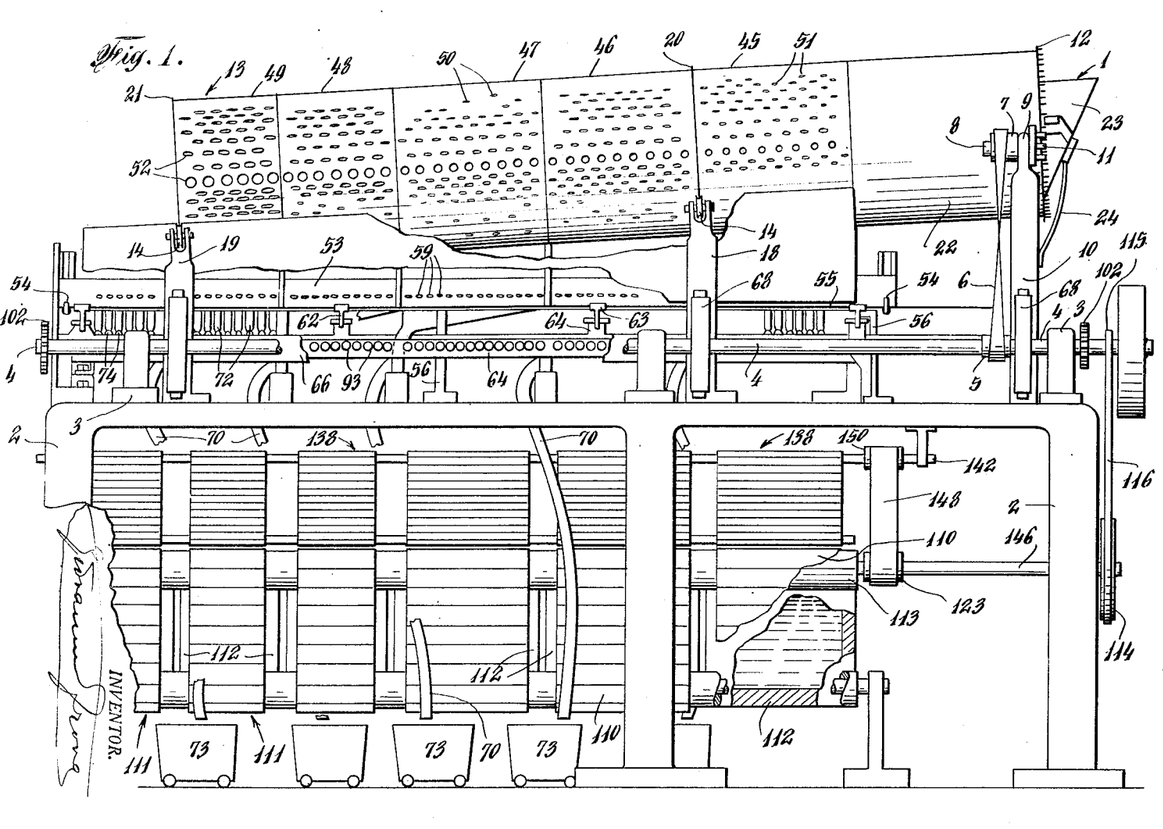
Fig. 1 is a side elevation of a machine embodying the invention in practical form and exhibiting the features and advantages thereof.
Figure 2:
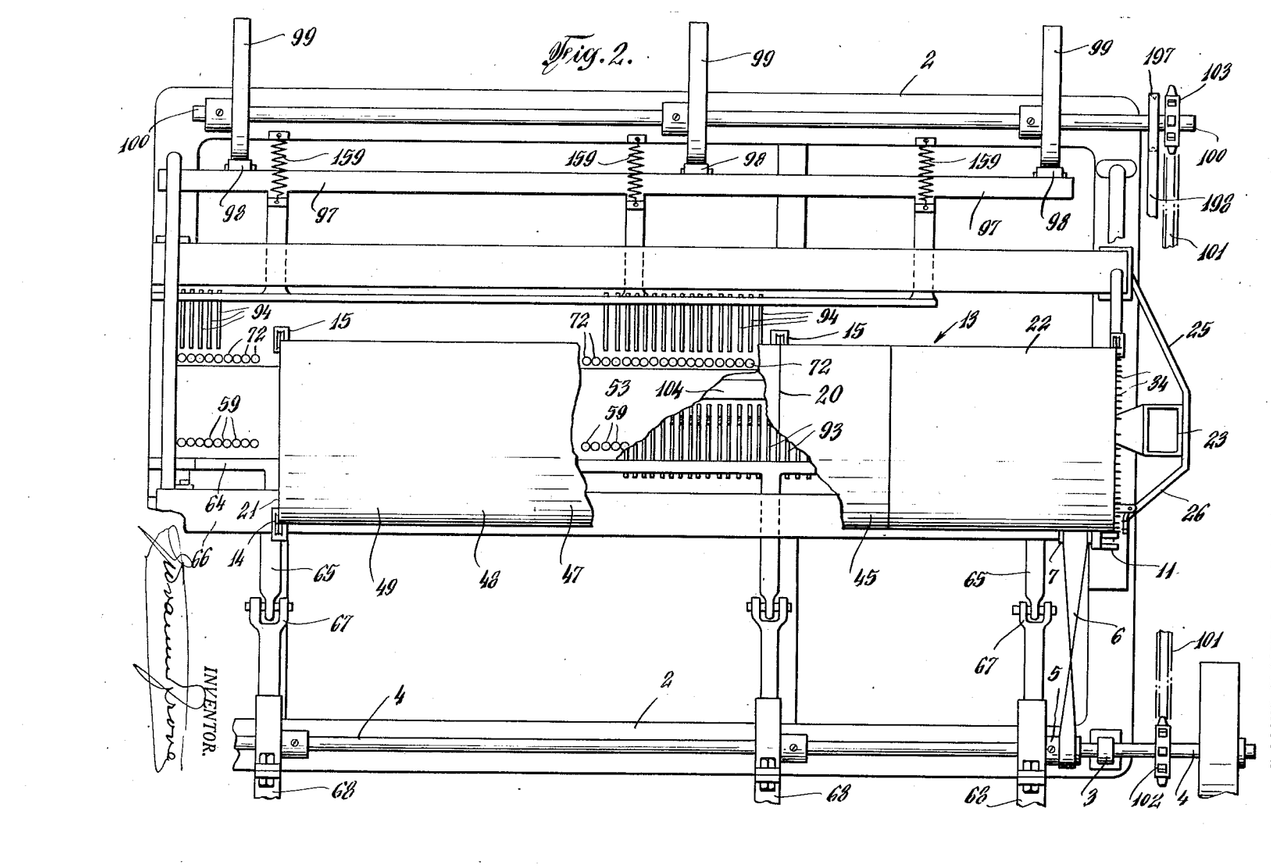
Fig. 2 is a top plan view of the same.
Figure 3:
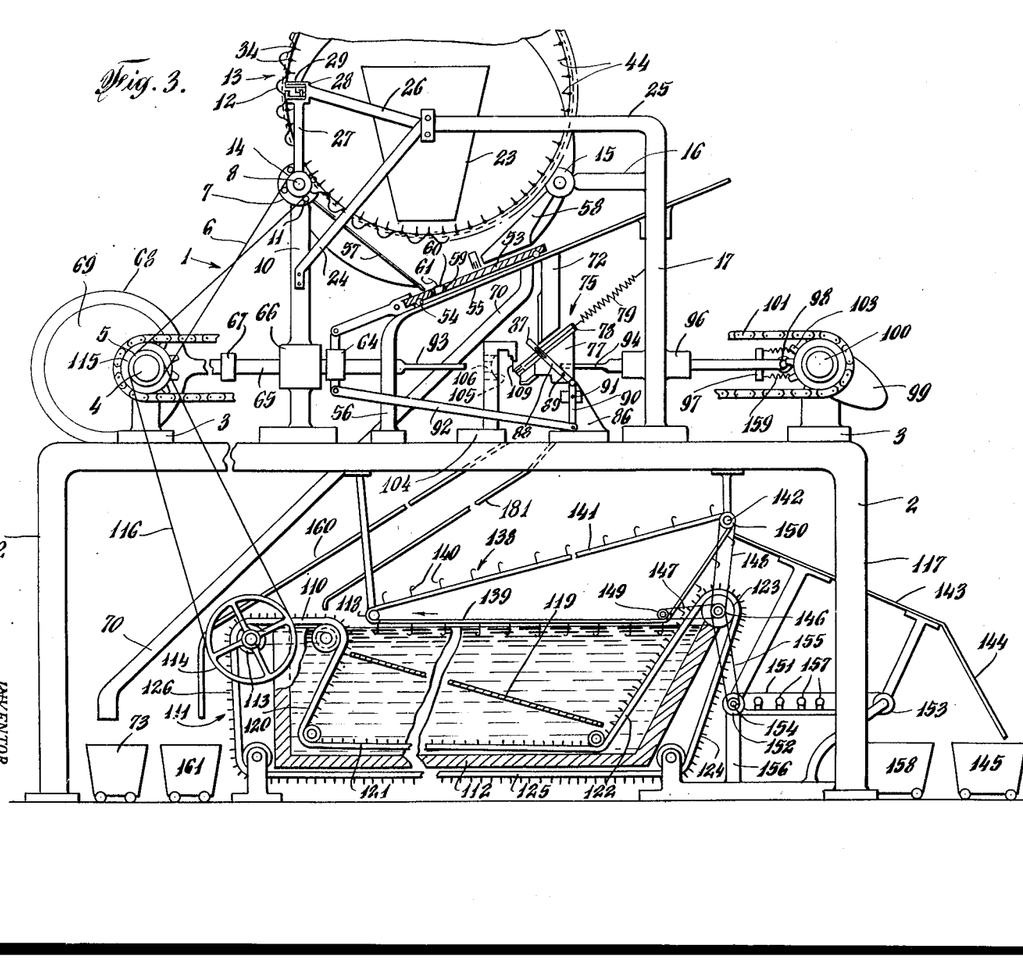
Fig. 3 is an end elevation of the machine as seen from the right in Fig. 1.

Following the cycle of operations in even better detail from the hopper 23 to the conveyor 11, it may be assumed that a more or less continuous supply of clusters of cherries are fed to the hopper whence the clusters feed in by gravity from said hopper 23 to the interior of the declustering section 22 of the grading drum 13, the latter being rotated clockwise in Figure 3. The clusters are picked up by the inwardly extending pins or arms 44 and as each cluster is caused to pass the bracket 28 and the cutters 29 and 30, the cutter 30 being operated through arm 38, rocking shaft 36 and contact of finger 35 on said shaft with projection 34 on the drum.

Figure 5:
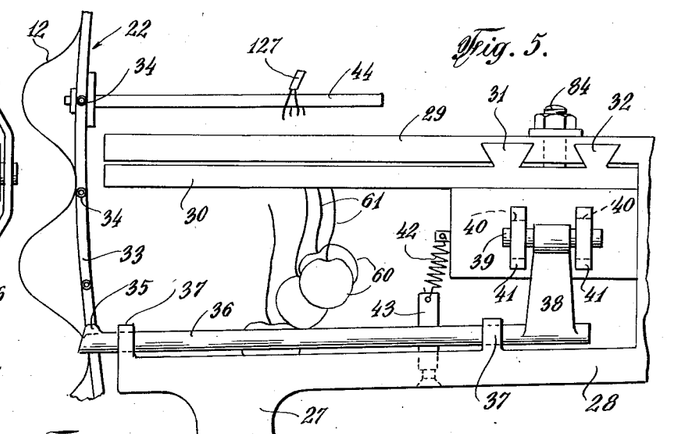
Fig. 5 is a further enlarged view of a portion of the same apparatus shown in Fig. 3, illustrating one of a plurality of devices for catching and separating a cluster of cherries, preparatory to grading of the cherries in succeeding sections of the drum.
Figures 8, 9, 10, 11:
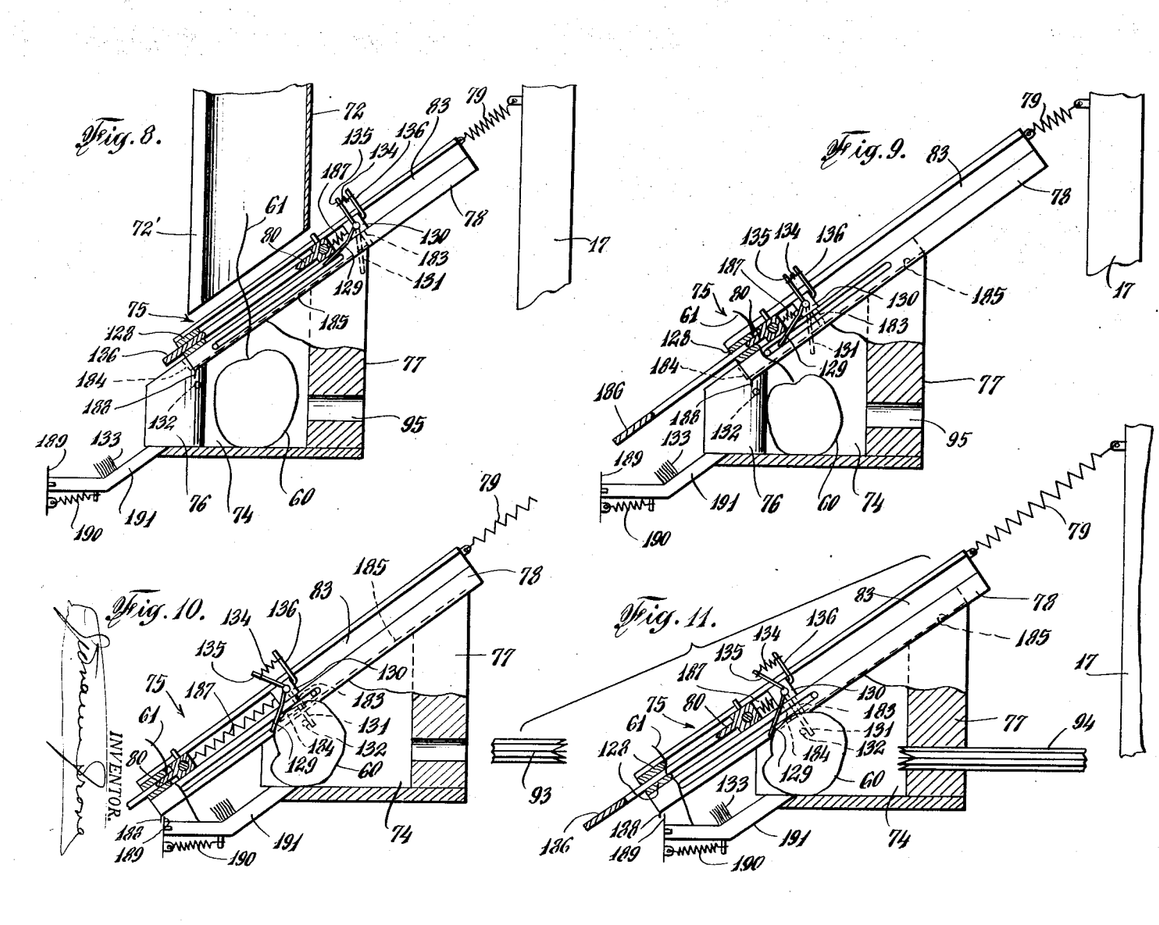

As shown in Figure 5 the connecting branch portion 127 of the cherries 60 will be cut off from the stems 61 while said branch portion is momentarily held on the arm 44 when the cherries will drop to the drum in separated condition. These cherries then gradually roll inward from the declustering section into the grading sections 45 to 49 to drop through the apertures 50, 51, and 52 as the case may be according to their sizes, and thence into the apertures 59 of feed plate 53 reciprocated from eccentric 69 through bar 64 and link 62, when these cherries will be passed to and drop into feed tubes 72 and deposited in troughs 74 as shown in Figure 8. As diagrammatically shown in Figures 9 through 11, etc., when the cherries have reached the troughs, the apertured plate 80 will be drawn down over the cherries in the troughs by levers 88 through further levers 90 and links 92 so that the stems of the cherries will be centered in the upper apices 82 of the peaked apertures 81 in the plate 80 will engage the lower ends 182 of slots 83, 83 in slidable frame 78 to draw the same positively downward upon the walls of the troughs, the apex portions of the peaked apertures of plate 80 pinching the stems against the lower edges 128 and turning the cherries by means of their stems to face punches 93 and drawing the same forward between resilient side walls 76, 76. During the downward movement of the slidable frame a rockable cherry holder 129 pivoted at each end in a block 130 slidably mounted in the slidable frame 78 will come into play. First by contact of a stop 183 meeting the lower end of stop 184 in a slot 185 in trough member 77 the block will come to a stop while at the same time a rear finger 131 rigidly associated with holder 129 will meet a fixed stop 132 on the machine causing the main portion 129 thereof to swing down against the cherry, preventing the same from being pulled out of the trough. While member 129 thus holds the cherry 60 in place the plate 80 and slidable frame 78 continue moving downwardly in inclined direction, and due to the fact that the stem 61 in each case is pinched between the apex portion 82 of the plate 80 and the edges 128 of the slidable frame, said stem is pulled free from the cherry as shown in Fig. 10. In this position the plate is in its lowest position with the lower portions 186 thereof projecting a distance beyond the slidable frame 78, said lower portions forming stem strippers as will immediately be explained. The blocks 130 just mentioned when stopped against the lower end 184 of slots 185 will not prevent the slidable frame or the plate from continuing as the only actual connection between the two is one or a group of springs 187 which tend to draw the block 130 down close to the plate. Stripper portions 186 of the plate will upon rear movement of the latter pass between the edges 128 and strip away the stems 61 which may remain between said edges while upwardly directed brushes 133 tend to engage the released stems and prevent the same from following any of the parts upon the slidable frame in the upward rear movement, but will rather cause the stems to remain behind and drop down from the brushes to be discarded as partly shown in Fig. 11.

When slidable frame 78 approaches its lowest limit of movement a projection 188 on the lowest portion thereof will engage a resilient pivoted stop 189 and by virtue of the spring 190 connected to one end of said pivoted stop and the bracket 191 projecting forwardly from trough member 77 so that said resilient stop will snap past the frame stop 188 and tend to partly impede or delay return movement of the frame upwardly upon the trough member. The effect of the break or stop thus described is to provide a sufficient time for the descent of the de-stemming device and allow the cherry to be drawn forward between the rubber wall 76 and de-stemming device and also the stems stripped from between edges 128 before the slidable frame again returns upward to initial position. During return movement of frame 78 the return finger 131 of cherry holder 129 is of course removed from contact with fixed stop 132 and block stop 183 from contact with end stop 184, which allows a spring 134 to draw the upper projection 135 of member 129 toward the lug 136 fixed upon block 130 thus swinging member 129 up and away from the cherry.

Figures 12, 13, 14, 15:
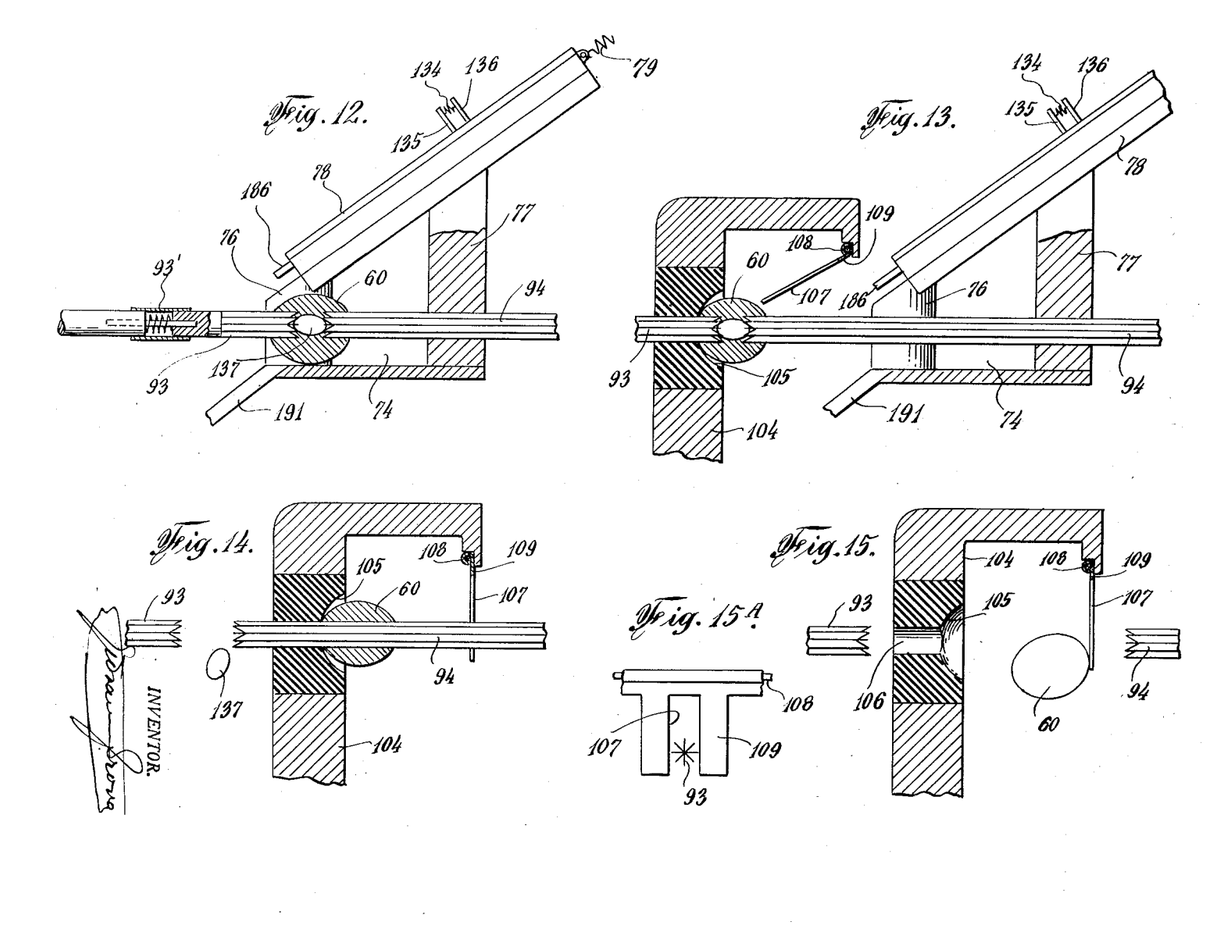

With the cherries in place as just described, the rotation of eccentric 69 and simultaneously cam 99 the punches 93 are caused to pass through apertures 106 and stop 104 to meet with the pit 137 within the cherry 60, as particularly shown in Figure 12, after which rotation of the cam 99 and eccentric 69 will cause the cherry thus impaled upon both forward and rear punches to be moved from its trough to pass gate 109 into cavity or channel 105, the gate once passed swinging down beyond the cherry as shown in Figure 13. At this moment each punch 94 continues through the aperture 106 in stop 104, while the cherry 60 remains in cavity 105, the stop plate virtually acting as a die plate for the cherry, while the punch pushes the pit 137 out through said aperture and down upon the outer or forward side of the stop as particularly shown in Figure 14. Inasmuch as stones or pits in cherries vary in size, the punches 93 and 94 are, of course provided with means for resiliently compensating for such differences and avoiding crushing or breakage of the pits. Thus, the punches 93 have a resilient spring take up portion 93' of more or less conventional construction which allows these punches to yield a little for larger sizes of pits and to project further for smaller pits. When the punch 93 and also punch 94 is withdrawn, as shown in Figure 15, the cherry is withdrawn against gate 109 by punch 94 but is stopped by said gate so that the punch is fully withdrawn from the cherry 60, thus freeing the latter to fall down into chute 181 when the members already described will be immediately ready for another cycle with fresh cherries just dropped from the grading drum.

As already mentioned the horizontal upper portion of 110 of the conveyor 111 receives the pitted cherries from the chute 181 and as this operates toward the right in Figure 3 indicated by the arrow within pulley 114 these cherries are fed to the surface 118 of the water upon which all sound pitted cherries will float toward the rear roller 123 above the rear end of the water tank 112. However, a counter-conveyor 138 operating toward the left as indicated by the arrow above the horizontal portion 139 in Figure 3 would by virtue of its hooks 140 pick up the floating sound cherries and convey the same upwardly upon its inclined upper stretch 141 toward roller 142 at which point these cherries will be released upon an inclined table 143 having a lower apron 144 allowing the cherries to slide down into a cart 145 for collecting the same. In order to operate conveyor 138, the roller 123 has a pulley 146 provided with belts 147, 148 rotating roller 149 and pulley 150 of roller 142, the roller 123 being of course operated by the conveyor belt 111. Perfect pitted cherries are light and therefore float in water, while broken ones sink, the perfect cherries containing air.

During operation it is possible that some cherries are of such unusual form or have defects so that when they are passed through the machine they are either mutilated and broken or perhaps missed by the punches so that they are not properly pitted, and all such cherries as they fall through chute 181 will upon being deposited upon the water at 118 immediately sink down to partition 119 and gravitate toward the lower end thereof, at which point they will be caught by the upwardly traveling portion 122 of the conveyor and brought over roller 123 and deposited upon a horizontal belt 151 which is preferably made of translucent or transparent material, for example, of cellulose acetate or a derivative thereof, or even a plastic of the vinyl series. This conveyor operates upon a pair of rollers 152, 153, the first having a pulley 154 connected to a pulley 146 of roller 123 by means of a belt 155, the rollers 152 and 153 being supported upon a frame 156, while within the belt is a series of electric lights 157 illuminating said belt from within so that cherries carried forward on said belt in the direction of the arrow immediately above same will be readily inspected by an operator inspecting said belt to discover cherries which still retain their pits. Such cherries will easily be seen because they will be relatively opaque, while the pitted cherries will be translucent. The unpitted cherries can thus be easily picked off and disposed of, while the broken cherries will continue along the belt and drop into collector cart 158.

Figures 18, 20:
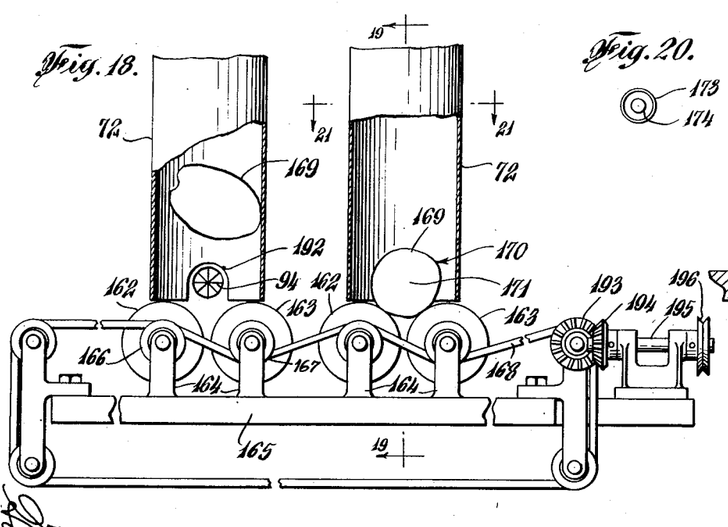

While variations may be resorted to and parts may be used without others, or be replaced by others of modified form, it is quite evident that if clusters of cherries are fed to the hopper 23, unpitted cherries having no stems will be dropped through tube 70 into the collector cart 73, the pits dropped upon the upper portion or roof 160 of the chute 181 to fall into a collector cart 161, while the perfect pitted cherries will be collected in collector cart 145 and the broken cherries in cart 158, and the operation will be continuous and wholly automatic throughout. In this connection it is to be noted that the machine is suitable not only for pitting cherries, but also for pitting plums, apricots and other freestone fruits and berries, particularly such as have stems. On the other hand, this machine is equally well adapted when slightly modified for pitting olives and other fruits, which usually do not have any stems, but instead are of more or less oval or ovoid form. When olives are to be pitted the de-stemming apparatus as well as the de-clustering mechanisms are of course not necessary, but another expedient may be incorporated in the machine to replace the de-stemming device 75, as particularly shown in Figures 18 and 19.

Figures 7A, 17, 25, 26:
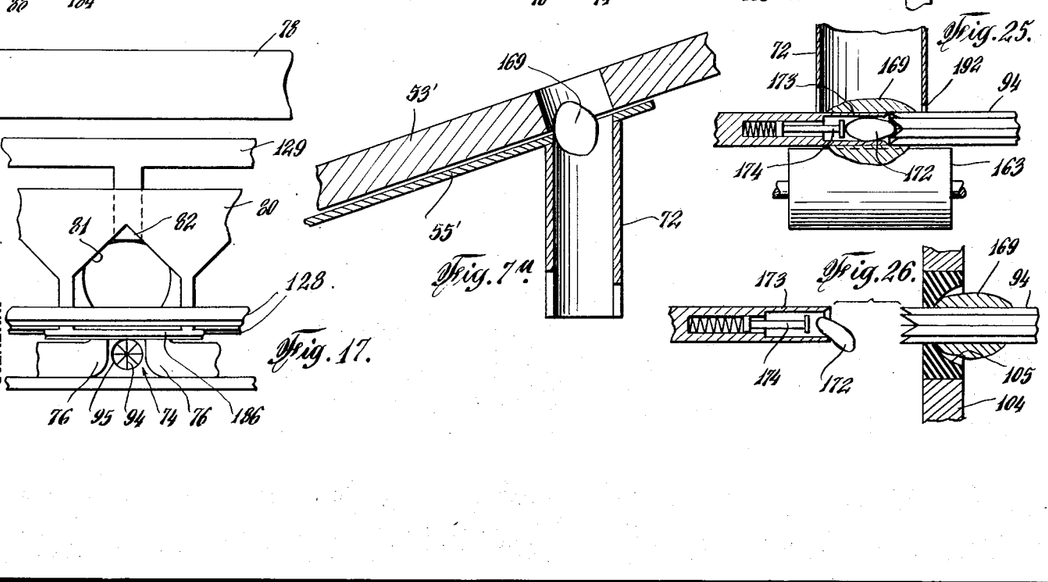
Fig. 7a is a section of a detail showing a modification of a portion of Fig. 7 for feeding olives and other oval fruits without stems.
Fig. 17 is a further enlarged view of a single de-stemming device of Figs. 8–16 as seen from the left in said figures.
Fig. 25 is a similar view to that of Fig. 19, showing the parts in an advanced stage of operation.
Fig. 26 is a further view of the same parts in a final stage of operation.

As shown in Fig. 7a, the feed plate 53 for use with cherries may be replaced by a feed plate 53' reciprocating above stationary plate 55' having only a single row of tubes 72 (one shown) for receiving the olives 169 instead of the two rows of tubes connected to plate 55 of the cherry feeding device described.

Thus, the olives are fed along by plate 53' to drop into the feed tubes 72, 72 which do not surmount the trough members as before, but rather terminate adjacent to the upper surface of a pair of rollers each at 162, 163, which are horizontally arranged and rotatably mounted upon bearings 164 fixed upon a general support 165 which may be part of the fixed frame of the machine. Pulleys 166, 167 on these rollers are all in contact with a belt 168 obtaining its drive from the main drive shaft 4, or the rear shaft 100 by gearing 193, 194 and belt 198 engaging with a pulley 196 on shaft 195 also carrying 194 and also engaging pulley 197 on drive shaft 4, the same parts being conventional as such details form no part of the actual invention. The rollers may be driven in opposite directions as indicated by the arrows, or in the same direction if desired, the main point being that both rollers associated with each feed tube rotate simultaneously so that when an olive 169 is deposited through the tube upon one pair of these rollers the rotation thereof will immediately cause the olive to line up its axis 171 parallel to the rollers as shown at 170.

Figure 19:
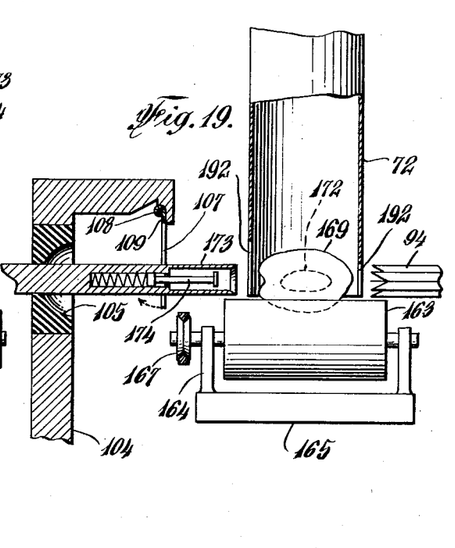
Fig. 19 is a section taken on line XIX—XIX in Fig. 18.
Figure 23:
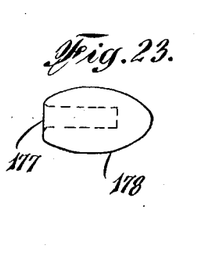
Fig. 23 is a side elevation of an olive pitted from the stem end.
Figure 24:
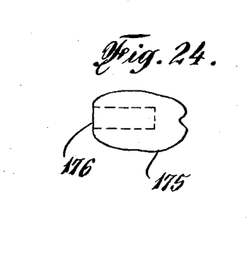
Fig. 24 is another elevation of an olive pitted from the other end.

Cut-away portions or apertures 192 may be formed in the lower ends of the tubes to provide clearance for the punches, and it is readily noted that rear star punch 94 is disposed in substantial alignment with the center 171 of the olive so that when the same is operated said olive will be freed from its pit by the rear punch 94 forcing the pit 172 into a hollow front punch 173 when the olive has been carried by both punches into contact with the cavity 105 and stop 104 beyond gate 109, as particularly shown in initial fashion in Figure 19. A spring operated ejector 174 tends to remove the pit from within punch 173 as soon as the olive has dropped behind the gate when freed from the punch, the olive then appearing as shown in either of Figures 23 or 24 at 175 with a pit removed from the stem end 176 or from the other end 177 of olive 178. The ejector 174 may omit the spring and a stop or other device may be used to operate or hold the ejector to expel the olive pit upon retraction of punch 173.

Figure 21:
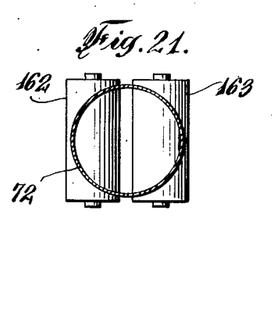
Fig. 21 is another section taken on line XX—XX in Fig. 18.
Figure 22:
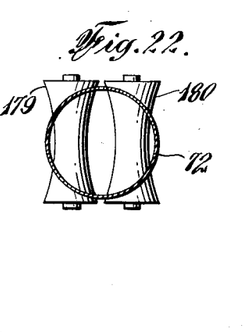
Fig. 22 illustrates a modification of the parts of Fig. 21.

In Figure 21 a section is shown of one of the feed tubes with its associated rollers beneath the olive being also shown in position, while the rollers are particularly shown as being cylindrical in form. The rollers may of course be modified so as to assume a concave form at 179, 180 in Figure 22, or any other profile may be adopted to suit the size and shape of the fruits to be handled.

Manifestly other variations may be resorted to, such as for example, the different sizes and shape of cutters for de-clustering and different forms of arms upon the de-clustering section of the drum, etc., may be adapted to suit conditions.

From the foregoing it is clear that a group of operations are performed by the machine without necessarily including any hand labor for transferring separated cherries to any de-stemming apparatus or the de-stemmed cherries to pitting apparatus, etc., but rather all operations succeed each other rapidly and automatically in order so that a constant supply of clusters of cherries or other fruit to the hopper 23 will produce a supply of pitted cherries or other fruits in the collecting carts upon the floor level below the machine, while stems and pits, etc., and broken fruit will be segregated.

Having now fully described my invention, I claim:

1. Apparatus for positioning and pitting olives and other elongated and rounded or ovoid fruits, comprising a plurality of rollers mounted in parallel spaced pairs, support means for rotatably supporting said rollers, means for rotating each pair of rollers simultaneously, means for feeding the fruits individually to each pair of rollers from above the latter, a series of reciprocable punches disposed in substantial parallelism with said rollers, means for operating said punches above said rollers to pit the fruit lying upon each pair thereof, stop means for the fruit disposed in the path of said punches, and gate means associated with said stop means for preventing return of the fruit to the rollers during withdrawal of the punches from said stop means and effective to strip said fruit from said punches.

2. Apparatus according to claim 1, having a second group of punches opposite the punches of the first group and of hollow construction so as to be capable of receiving the pits therein when cooperating with the first mentioned punches, means for operating both sets of punches, and means for ejecting the pits from the punches of the second group.

3. Apparatus according to claim 1, having feeding means for distributing olives or other fruits to the rollers preparatory to aligning the fruits with the pit punches, including a plate having a group of holes for receiving fruits dropped on said plate, means for slidably supporting said plate and reciprocating the same plate, a fixed plate beneath said first mentioned plate having a group of holes with which the holes in the slidable plate register in one position of the latter so as to allow the fruits to drop through the holes in said fixed plate, and tubes individually communicating with the holes in said fixed plate and leading down to corresponding pairs of said rollers to deliver the olives or other fruits to the latter when dropped through the holes in said plates.

4. Apparatus according to claim 1, wherein the pit punches are skeleton shaped in cross section to cut into the olives or other fruits without removing the flesh thereof.

5. Apparatus according to claim 1, in which the pit punches are skeleton shaped in cross section to cut into each olive without removing the flesh thereof, and having a second group of pit punches of hollow construction opposite the punches of the first group capable of removing a cylinder of the flesh of the olive at one end of the pit and of removing the pit therewith when cooperating with the first mentioned punches, in order to prepare the olives for receiving fillers, means for operating both sets of punches, and means for ejecting the pits from the hollow punches of the second group.

6. Apparatus according to claim 1, having a second group of pit punches opposite the first group of punches, the punches of both groups being skeleton shaped in cross section so as to cut into the olives or other fruits without removing the flesh thereof, and means for operating both sets of punches.

GIOVANNI FROVA.